US012567240B2

(12) United States Patent
Kuen et al.

(10) Patent No.: US 12,567,240 B2
(45) Date of Patent: Mar. 3, 2026

(54) OPEN VOCABULARY INSTANCE SEGMENTATION WITH NOISE ESTIMATION AND ROBUST STUDENT

(71) Applicant: ADOBE INC., San Jose, CA (US)

(72) Inventors: Jason Wen Yong Kuen, Santa Clara, CA (US); Dat Ba Huynh, Boston, MA (US); Zhe Lin, Clyde Hill, WA (US); Jiuxiang Gu, Baltimore, MD (US)

(73) Assignee: ADOBE INC., San Jose, CA (US)

( * ) Notice: Subject to any disclaimer, the term of this patent is extended or adjusted under 35 U.S.C. 154(b) by 684 days.

(21) Appl. No.: 17/806,097

(22) Filed: Jun. 9, 2022

(65) Prior Publication Data

US 2023/0401827 A1     Dec. 14, 2023

(51) Int. Cl.
| | |
|---|---|
| *G06V 10/774* | (2022.01) |
| *G06V 10/26* | (2022.01) |
| *G06V 10/75* | (2022.01) |
| *G06V 10/77* | (2022.01) |
| *G06V 10/776* | (2022.01) |
| *G06V 10/82* | (2022.01) |

(52) U.S. Cl.
CPC ............ *G06V 10/774* (2022.01); *G06V 10/26* (2022.01); *G06V 10/759* (2022.01); *G06V 10/7715* (2022.01); *G06V 10/776* (2022.01); *G06V 10/82* (2022.01)

(58) Field of Classification Search
CPC .... G06V 10/774; G06V 10/26; G06V 10/759; G06V 10/7715; G06V 10/776; G06V 10/82; G06V 10/255; G06V 10/28; G06V 10/424; G06V 20/70

USPC ......................................................... 382/157
See application file for complete search history.

(56) References Cited

U.S. PATENT DOCUMENTS

| | | | | |
|---|---|---|---|---|
| 11,450,008 | B1 * | 9/2022 | Tyagi | G06N 3/0464 |
| 12,198,453 | B2 * | 1/2025 | Gao | G06F 40/126 |
| 2020/0334502 | A1 * | 10/2020 | Tu | G06N 3/084 |
| 2021/0365739 | A1 * | 11/2021 | Carmena | G06V 10/764 |
| 2021/0366128 | A1 * | 11/2021 | Kim | G06T 7/194 |
| 2023/0154173 | A1 * | 5/2023 | Zhang | G06N 3/084 382/156 |

(Continued)

FOREIGN PATENT DOCUMENTS

| | | | |
|---|---|---|---|
| CN | 110490817 A | * | 11/2019 |

OTHER PUBLICATIONS

Huynh, et al., "Open-Vocabulary Instance Segmentation via Robust Cross-Modal Pseudo-Labeling", arXiv:2111.12698v1 [cs.CV] Nov. 24, 2021, 12 pages.

*Primary Examiner* — Jennifer Mehmood
*Assistant Examiner* — Pardis Sohraby
(74) *Attorney, Agent, or Firm* — F. CHAU & ASSOCIATES, LLC

(57) ABSTRACT

Systems and methods for image segmentation are described. Embodiments of the present disclosure receive a training image and a caption for the training image, wherein the caption includes text describing an object in the training image; generate a pseudo mask for the object using a teacher network based on the text describing the object; generate a mask for the object using a student network; compute noise information for the training image using a noise estimation network; and update parameters of the student network based on the mask, the pseudo mask, and the noise information.

19 Claims, 10 Drawing Sheets

(56) References Cited

U.S. PATENT DOCUMENTS

2023/0169754 A1*  6/2023  Irie ...................... G06V 10/761
                                                    382/224
2023/0177810 A1*  6/2023  Xu ....................... G06V 10/774
                                                    382/159

* cited by examiner

Figure 3:
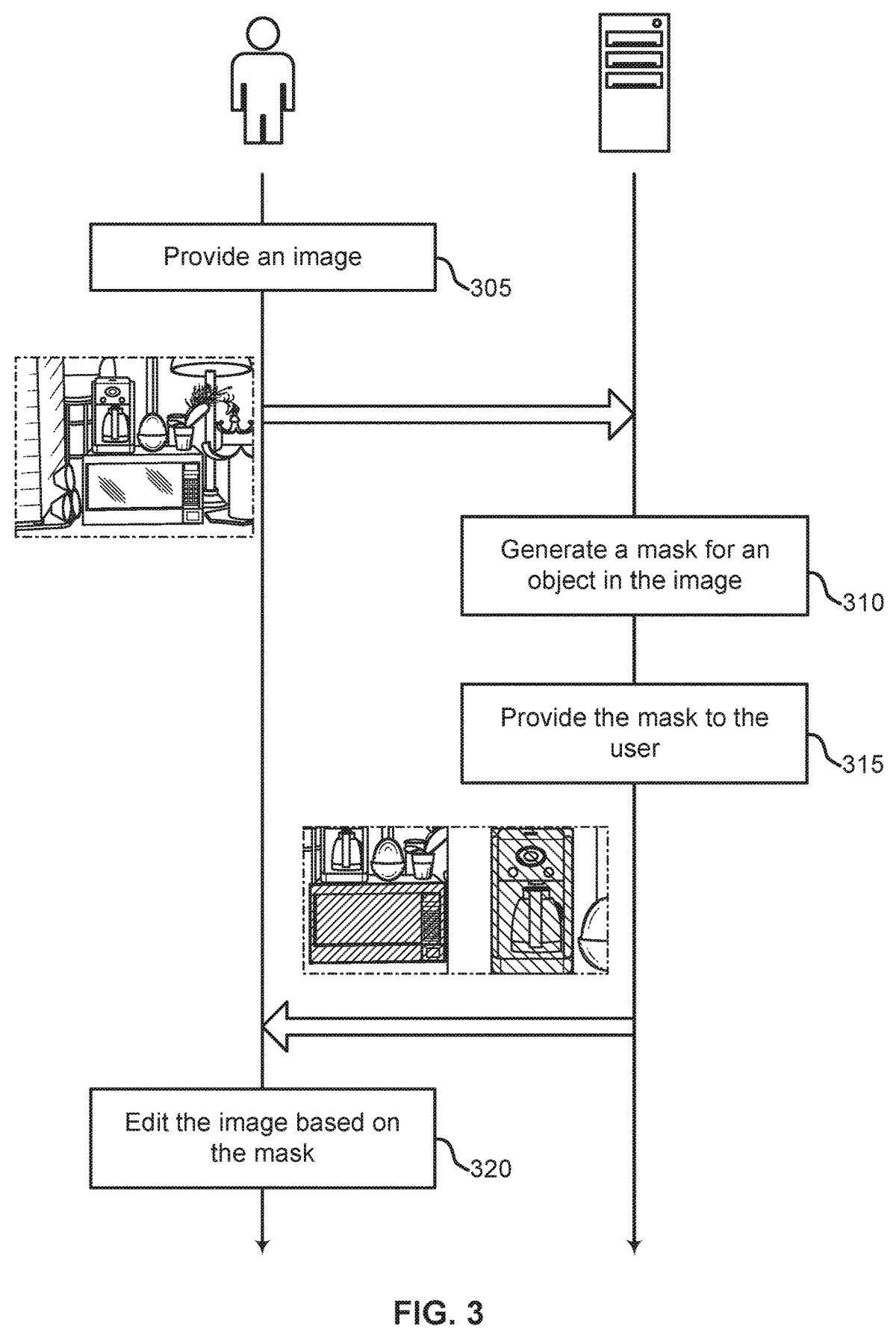

Provide an image — 305

Generate a mask for an object in the image — 310

Provide the mask to the user — 315

Edit the image based on the mask — 320

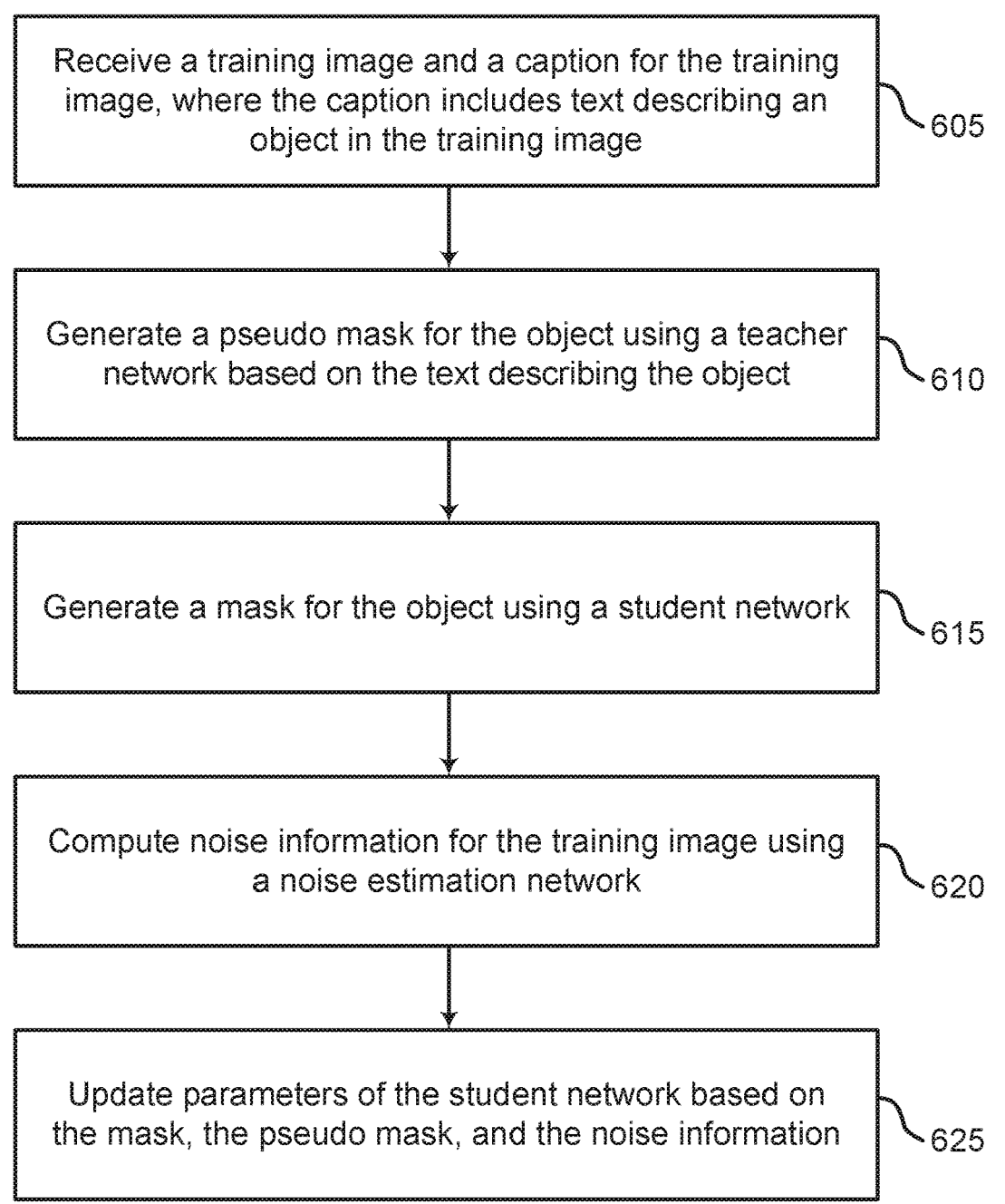

Receive a training image and a caption for the training image, where the caption includes text describing an object in the training image 605

Generate a pseudo mask for the object using a teacher network based on the text describing the object 610

Generate a mask for the object using a student network 615

Compute noise information for the training image using a noise estimation network 620

Update parameters of the student network based on the mask, the pseudo mask, and the noise information 625

FIG. 6

Combine the mask with the noise information to obtain a noise-adjusted mask
⟶ 805

Compute a cross-entropy loss based on the pseudo mask and the noise-adjusted mask
⟶ 810

Update the parameters of the student network are updated based on the cross-entropy loss
⟶ 815

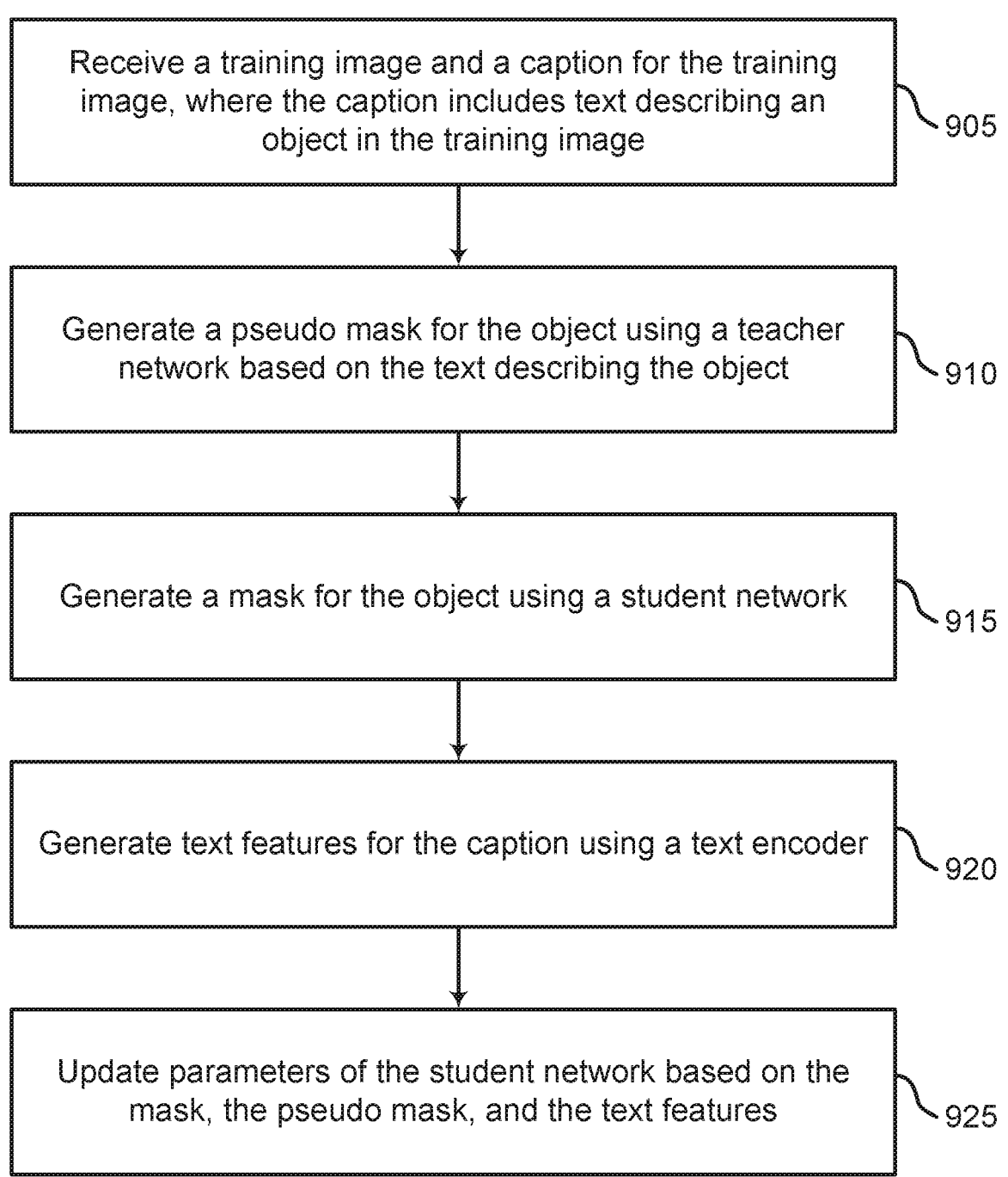

Receive a training image and a caption for the training image, where the caption includes text describing an object in the training image — 905

Generate a pseudo mask for the object using a teacher network based on the text describing the object — 910

Generate a mask for the object using a student network — 915

Generate text features for the caption using a text encoder — 920

Update parameters of the student network based on the mask, the pseudo mask, and the text features — 925

FIG. 9

OPEN VOCABULARY INSTANCE SEGMENTATION WITH NOISE ESTIMATION AND ROBUST STUDENT

BACKGROUND

The following relates generally to image segmentation. Image segmentation is a form of digital image processing, which refers to the use of a computer to process or edit a digital image using an algorithm or a processing network. Image processing software is commonly used for image editing, robot navigation, etc. Image segmentation is an example of an image processing task that identifies and labels objects within an image. In some cases, image segmentation enables computers to interpret visual information as human beings do. Image processing systems can label images in a dataset based on detected objects in a process known as object detection. Object detection can be combined with other computer vision tasks such as semantic segmentation and instance segmentation. Semantic segmentation refers to the assignment of categories (e.g., vehicle, animal, etc.) to each pixel in an image. Instance segmentation detects multiple objects from the same class as individual instances. For example, multiple cars can be identified within an image.

Recently, deep learning techniques have been used for instance segmentation. However, deep learning-based methods often involve high annotation costs during training and depend on labeling known classes. As a result, these methods are costly to scale to cover a large number of classes. Therefore, there is a need in the art for improved object detection systems that can generalize to unseen classes.

SUMMARY

The present disclosure describes systems and methods for image segmentation. Embodiments of the present disclosure include an image segmentation apparatus configured to generate a mask indicating location of an object and a class prediction for the object depicted in an image. In some embodiments, the image processing apparatus includes a teacher network and a student network. The teacher network is pre-trained on an annotated mask dataset by comparing the object classification and the mask to the ground truth object classification and the ground truth mask, respectively. Additionally, the teacher network generates a pseudo mask for an object in a captioned image where the caption includes text (e.g., noun phrases) describing the object. A noise estimation network of the image segmentation apparatus can estimate the noise information or confidence of pseudo masks generated by the teacher network and down-weight noisy pseudo masks. This way, it prevents the student network from being over-trained on inaccurate mask predictions coming from the teacher network. The student network generates a mask for the object and the student network is trained based on the mask, the pseudo mask generated by the teacher network, and the noise information computed by the noise estimation network.

A method, apparatus, and non-transitory computer readable medium for training a machine learning model are described. One or more embodiments of the method, apparatus, and non-transitory computer readable medium include receiving a training image and a caption for the training image, wherein the caption includes text describing an object in the training image; generating a pseudo mask for the object using a teacher network based on the text describing the object; generating a mask for the object using a student network; computing noise information for the training image using a noise estimation network; and updating parameters of the student network based on the mask, the pseudo mask, and the noise information.

A method, apparatus, and non-transitory computer readable medium for training a machine learning model are described. One or more embodiments of the method, apparatus, and non-transitory computer readable medium include receiving a training image and a caption for the training image, wherein the caption includes text describing an object in the training image; generating a pseudo mask for the object using a teacher network based on the text describing the object; generating a mask for the object using a student network; generating text features for the caption using a text encoder; and updating parameters of the student network based on the mask, the pseudo mask, and the text features.

An apparatus and method for training a machine learning model are described. One or more embodiments of the apparatus and method include a teacher network configured to generate a pseudo mask for an object in an image based on text describing the object in the image; a student network configured to generate a mask for the object; a noise estimation network configured to compute noise information for the image; and a training component configured to update parameters of the student network based on the mask, the pseudo mask, and the noise information.

BRIEF DESCRIPTION OF THE DRAWINGS

FIG. 3 shows an example of image editing according to aspects of the present disclosure.

FIG. 5 shows an example of a method for training a machine learning model according to aspects of the present disclosure.

FIG. 6 shows an example of a method for training a machine learning model using noise estimation according to aspects of the present disclosure.

FIG. 9 shows an example of a method for training a machine learning model based on text features according to aspects of the present disclosure.

DETAILED DESCRIPTION

Figure 1:
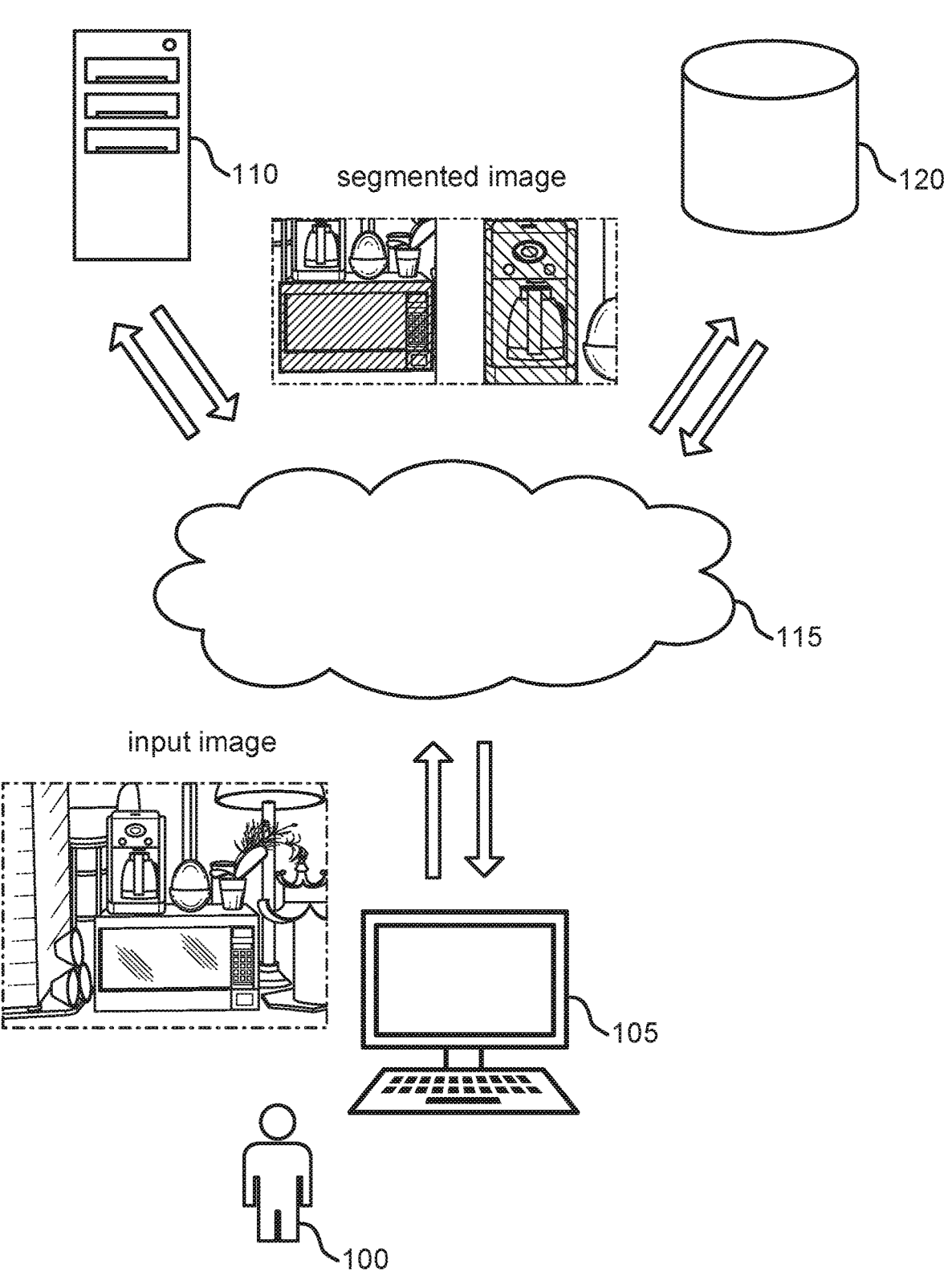
FIG. 1 shows an example of an image processing system according to aspects of the present disclosure.

The present disclosure describes systems and methods for image segmentation. Embodiments of the present disclosure include an image segmentation apparatus configured to generate a mask indicating location of an object and a class prediction for the object depicted in an image. In some embodiments, the image processing apparatus includes a teacher network and a student network. The teacher network is pre-trained on an annotated mask dataset by comparing the object classification and the mask to the ground truth object classification and the ground truth mask, respectively.

According to an embodiment, a student network of the image segmentation apparatus is trained to recognize new objects guided by a teacher network and captions for the new objects. The student network is exposed to a relatively large range of classes via pseudo masks and captions describing objects in the image. As a result, the student network trained on cheap caption dataset can efficiently produce class prediction during inference for objects from unseen classes.

Image processing systems can perform classification, object localization, semantic segmentation, and instance-level segmentation. An image includes one or more objects. Conventional systems identify and segment each of the objects. In some cases, image segmentation systems are trained based on available mask annotations. Mask annotating is the process of labeling or classifying a mask of an image using labels such as text, annotation tools, etc. Typically, a mask indicates a region of interest of the image. Mask annotation metadata of images may be manually added by a human annotator. Datasets including such mask annotations are then used to train a machine learning model for object detection using supervised learning.

However, mask annotations are costly and usually not available for training a customized object detection model. The class labels in a dataset are manually added, which requires a significant amount of time. High annotation cost of deep-learning-based instance-level detection models can make these models unsuitable for use in real-world applications such as image editing on mobile devices.

Embodiments of the present disclosure include an image processing network comprising a teacher network and a student network. The teacher network generates a pseudo mask for an object in an image based on text describing the object in the image. In some examples, the teacher network is pre-trained based on a mask dataset having mask annotations. The mask dataset includes a relatively small number of classes (i.e., known classes). That is, the teacher network's knowledge is limited to base classes of the mask dataset. The teacher network is pre-trained via supervised learning by comparing the object classification and the mask to the ground truth object classification and the ground truth mask, respectively.

In some embodiments, the teacher network generates a pseudo mask for an object based on a captioned image where the caption includes text (e.g., noun phrases) describing the object. A noise estimation network of the image segmentation apparatus can estimate the noise information or confidence of pseudo masks generated by the teacher network and down-weight noisy pseudo masks. This can prevent the student network from being overtrained on inaccurate predictions from the teacher network. The student network generates a mask for the object and the student network is trained based on the mask, the pseudo mask generated by the teacher network, and the noise information computed by the noise estimation network.

By using caption information and pseudo masks generated by the teacher network, embodiments of the present disclosure train a student network to have expanded knowledge than the teacher network (i.e., the student network can detect and segment objects from unseen classes). The student network generates a mask for the object in the image. The student network is trained using a detection loss based on the pseudo mask from the teacher network and the mask. In an embodiment, the teacher network translates high-level caption information (e.g., text describing an object in an image) into pixel-wise mask information and guides the training of the student network using captioned images and pseudo masks. In some examples, a captioned image includes noun phrases describing one or more objects in the image.

According to some embodiments, the image segmentation apparatus includes a cross-modal pseudo-labeling framework that aligns textual modality (e.g., captions) and visual modality in captioned images to create caption-driven pseudo masks and generalize to unseen classes beyond base classes. That is, a teacher model is first trained on base classes and then the trained teacher network selects object regions whose visual features are most compatible with the semantics of words in captions. The regions are further segmented into pseudo masks for object phrases in captions. Accordingly, the student knowledge is expanded to a relatively large range of classes as appeared in the caption information that are otherwise not available in mask annotation datasets.

According to some embodiments, the student network is trained to recognize new objects using the teacher network and captions for the new objects. A noise estimation network of the image segmentation apparatus is used to estimate the noise or confidence of the teacher network to prevent the student network from being over-trained on incorrect predictions from the teacher network. That is, the student network is configured to account for noises in pseudo masks generated by the teacher network and to down-weight influence from noisy pseudo masks or masks with low confidence. The student network can selectively distill mask knowledge by estimating the pseudo mask noise levels and accordingly, adverse impact of noisy pseudo masks is reduced.

The student network, via a training component, jointly learns object detection and estimates pseudo-mask noise levels to down-weight incorrect predictions from the teacher network. For pseudo masks with high mask noises (i.e., unreliable pseudo masks), the student network down-weights a training loss to eliminate error propagation. In some examples, mask noises may be considered as a proxy for how reliable the pseudo masks are. The noise level of each pseudo mask is computed as the average of pixel noise. In addition, the student network computes a reliability score for each object in captions as the inverse of the average noise level to indicate the mask reliability.

Embodiments of the present disclosure may be used in the context of image editing applications. For example, an image processing network based on the present disclosure may take an image that depicts an object and efficiently generate a mask that indicates a location of the object in the image and class prediction for the object. An example application in the image editing context is provided with reference to FIGS. 3-4. Details regarding the architecture of an example image segmentation apparatus are provided with reference to FIGS. 1-2. Example training processes are described with reference to FIGS. 5-10.

Network Architecture

Figure 2:
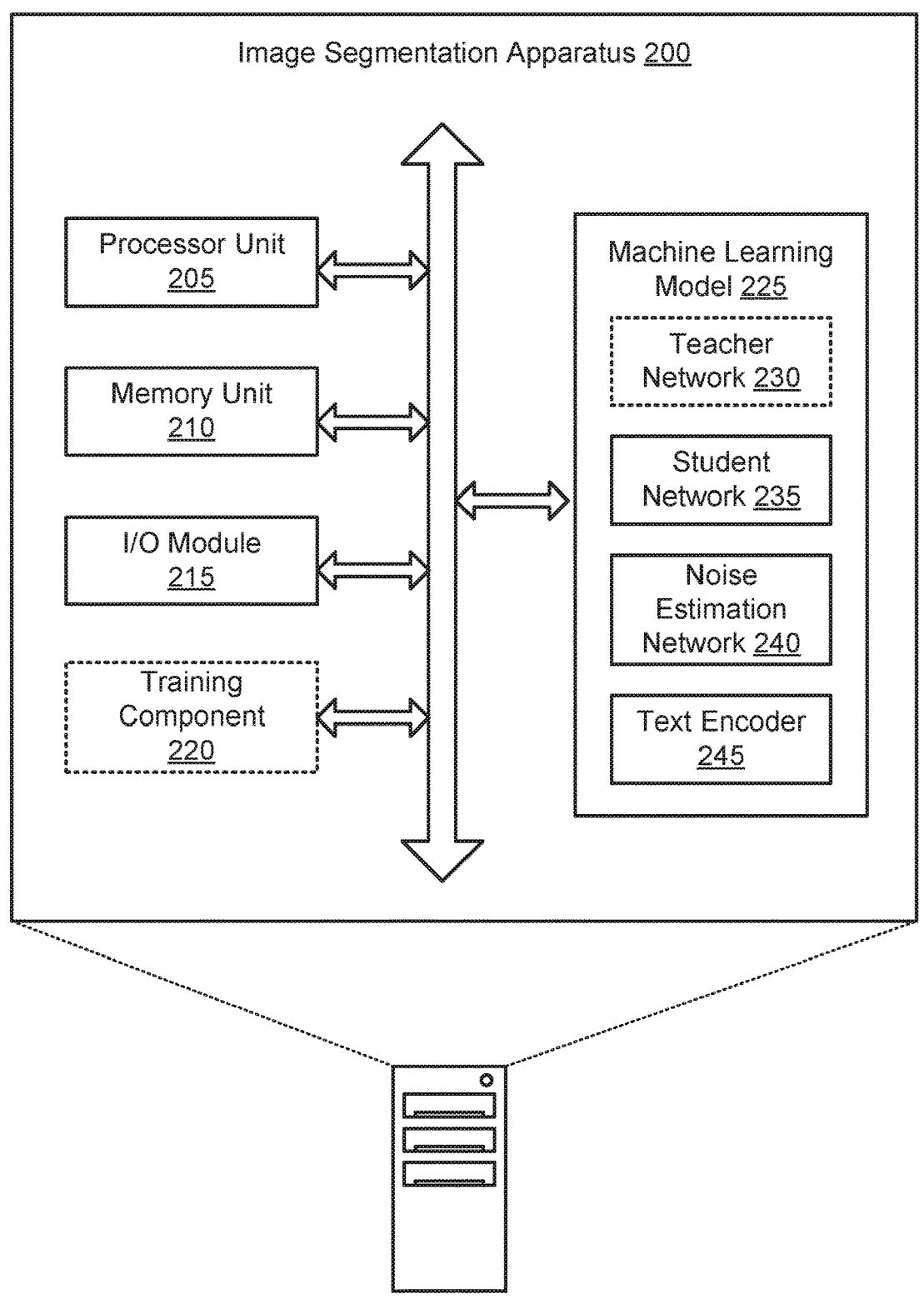
FIG. 2 shows an example of an image segmentation apparatus according to aspects of the present disclosure.

In FIGS. 1-2, an apparatus and method for training a machine learning model are described. One or more embodiments of the apparatus and method include a teacher network configured to generate a pseudo mask for an object in an image based on text describing the object in the image; a student network configured to generate a mask for the object; a noise estimation network configured to compute noise information for the image; and a training component configured to update parameters of the student network based on the mask, the pseudo mask, and the noise information.

Some examples of the apparatus and method further include a text encoder configured to encode the text describing the object to obtain text features, wherein the training component is configured to compute a cross-modal loss based on the text features.

In some examples, the training component includes a mapping component configured to map image features corresponding to the image into an embedding space of the text features. In some examples, the student network comprises an image encoder configured to generate image features for the image and a mask generation head configured to generate the mask for the object. In some examples, the teacher network comprises an embedding head configured to generate a semantic embedding of the image and a mask head configured to generate the pseudo mask.

FIG. 1 shows an example of an image processing system according to aspects of the present disclosure. The example shown includes user 100, user device 105, image segmentation apparatus 110, cloud 115, and database 120. Image segmentation apparatus 110 is an example of, or includes aspects of, the corresponding element described with reference to FIG. 2.

In the example of FIG. 1, user 100 provides an image depicting one or more objects via user device 105. In some examples, the image depicts a kitchen area having a microwave and a coffee machine. User 100 communicates with image segmentation apparatus 110 via user device 105 and cloud 115. User device 105 transmits the image to image segmentation apparatus 110. Image segmentation apparatus 110 generates a mask where the mask indicates a location of each target object (i.e., the microwave and the coffee machine) of the image. In this example, a corresponding mask is represented by the shading over the target object. In some cases, image segmentation apparatus 110 generates a class prediction for the object via bounding box and label. Image segmentation apparatus 110 returns a segmented image to user 100, where the segmented image includes the masks, bounding boxes identifying the target objects (i.e., microwave, coffee machine), the class prediction, or any combination thereof. User 100 can further edit the segmented image using an image editing application implemented on user device 105.

Figure 4:
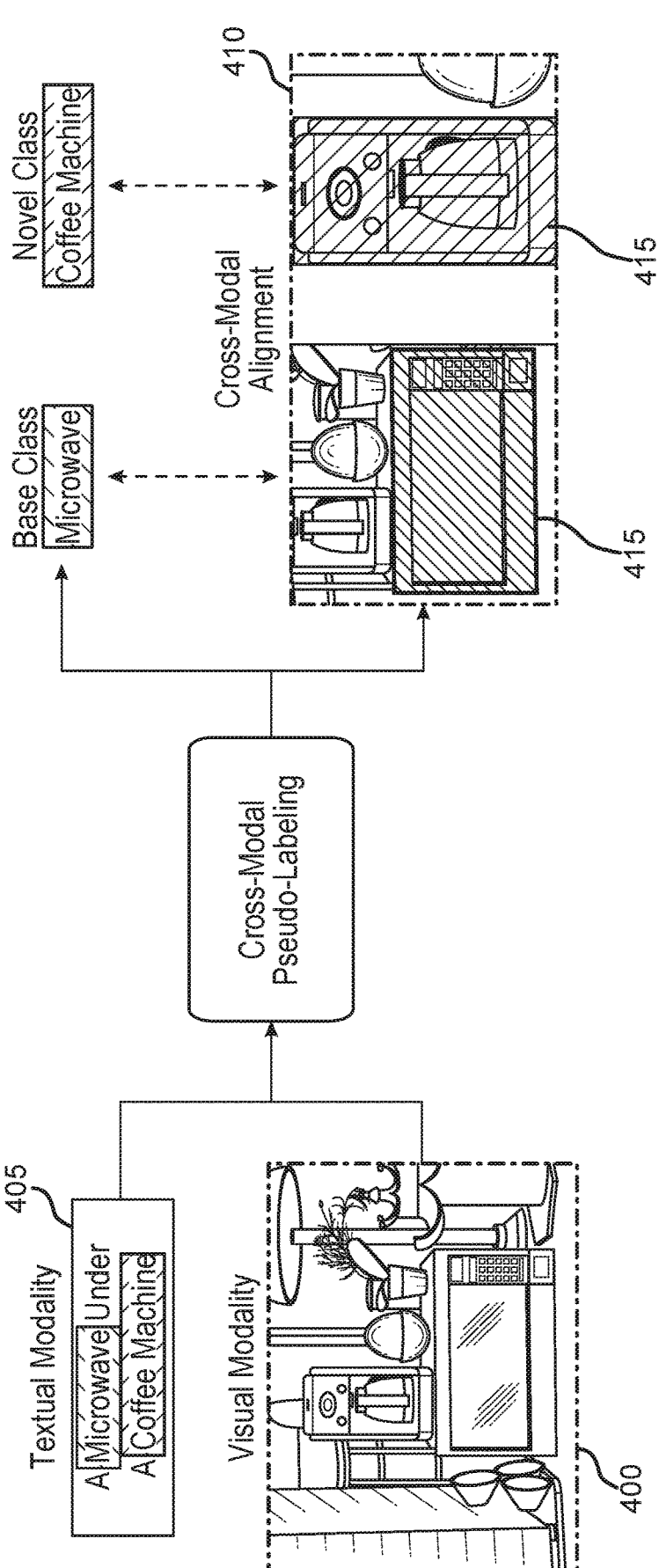
FIG. 4 shows an example of image segmentation according to aspects of the present disclosure.

At training, image segmentation apparatus 110 receives a training image and a caption for the training image, where the caption includes text describing an object in the training image. In some examples, the caption describes multiple objects (e.g., noun phrases such as "microwave" and "coffee machine" as shown in FIG. 4). A teacher network of image segmentation apparatus 110 generates a pseudo mask for the object based on the text describing the object. A training component of image segmentation apparatus 110 can extract each of the noun phrases (if a caption describes multiple objects of a training image via multiple noun phrases) independently for training a student network on the pseudo masks of different objects. A student network of image segmentation apparatus 110 generates a mask for the object. A noise estimation network of image segmentation apparatus 110 computes noise information for the training image. The student network is trained based on the mask, the pseudo mask, and the noise information. A captioned image refers to an image associated with a caption.

At training, image segmentation apparatus 110 includes the teacher network and the student network, where the teacher network is used to train the student network (i.e., teacher guides the student). The teacher network may not be a part of image segmentation apparatus 110 at inference time. The process of using image segmentation apparatus 110 is further described with reference to FIG. 3.

User device 105 may be a personal computer, laptop computer, mainframe computer, palmtop computer, personal assistant, mobile device, or any other suitable processing apparatus. In some examples, user device 105 includes software that an image processing application (e.g., image editing application). In some examples, the image editing application on user device 105 may include functions of image segmentation apparatus 110. That is, image segmentation apparatus 110 may be implemented on user device 105.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Image segmentation apparatus 110 includes a computer implemented network comprising a teacher network, a student network, a noise estimation network, and a text encoder. Image segmentation apparatus 110 may also include a processor unit, a memory unit, an I/O module, and a training component. The training component is used to train a machine learning model (or an image segmentation network). Additionally, image segmentation apparatus 110 can communicate with database 120 via cloud 115. In some cases, the architecture of the image segmentation network is also referred to as a network or a network model. Further detail regarding the architecture of image segmentation apparatus 110 is provided with reference to FIGS. 1-2. Further detail regarding the training of image segmentation apparatus 110 is provided with reference to FIGS. 5-10.

In some cases, image segmentation apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

FIG. 2 shows an example of an image segmentation apparatus 200 according to aspects of the present disclosure. The example shown includes image segmentation apparatus 200, processor unit 205, memory unit 210, I/O module 215, training component 220, and machine learning model 225. Machine learning model 225 is an example of, or includes aspects of, the corresponding element described with reference to FIG. 5. In one embodiment, machine learning model 225 includes teacher network 230, student network 235, noise estimation network 240, and text encoder 245. Image segmentation apparatus 200 is an example of, or includes aspects of, the corresponding element described with reference to FIG. 1.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 215 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image segmentation apparatus 200 includes a computer implemented artificial neural network (ANN), where an ANN (e.g., a student network) is trained to generate a mask for an object in an image. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image segmentation apparatus 200 includes a convolutional neural network (CNN) for image segmentation. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 220 receives a training image and a caption for the training image, where the caption includes text describing an object in the training image. In some examples, training component 220 updates parameters of the student network based on the mask, the pseudo mask, and the noise information. In some examples, training component 220 maps the features corresponding to each of the set of candidate regions into an embedding space of the text features, where the comparison is based on the mapping.

In some examples, training component 220 computes a cross-entropy loss based on the pseudo mask and the noise-adjusted mask, where the parameters of the student network are updated based on the cross-entropy loss. In some examples, training component 220 compares each of the set of masks to a corresponding pseudo mask of the set of pseudo masks to obtain the cross-entropy loss.

In some examples, training component 220 computes a cross-modal loss based on the image features and the text features, where the parameters of the student network are updated based on the cross-modal loss. In some examples, training component 220 receives an annotated training set, where each image in the annotated training set is associated with ground truth annotations. Training component 220 computes a ground truth loss by comparing the predicted annotations to the ground truth annotations, where the parameters of the student network are updated based on the ground truth loss. In some examples, the annotated training set does not include annotation data for the object in the training image.

In some examples, training component 220 receives an annotated training set, where each image in the annotated training set is associated with ground truth annotations. Training component 220 computes a ground truth loss by comparing the predicted annotations to the ground truth annotations. Training component 220 updates parameters of the teacher network 230 based on the ground truth loss.

According to some embodiments, training component 220 receives a training image and a caption for the training image, where the caption includes text describing an object in the training image. In some examples, training component 220 updates parameters of the student network based on the mask, the pseudo mask, and the text features. In some examples, training component 220 computes a cross-modal loss based on the image features and the text features, where the parameters of the student network are updated based on the cross-modal loss. In some examples, training component 220 computes a cross-entropy loss based on the pseudo mask and the noise-adjusted mask, where the parameters of the student network are updated based on the cross-entropy loss.

According to some embodiments, training component 220 is configured to update parameters of the student network based on the mask, the pseudo mask, and the noise information. In some examples, the training component 220 includes a mapping component configured to map image features corresponding to the image into an embedding space of the text features. Training component 220 is an example of, or includes aspects of, the corresponding element described with reference to FIG. 10. In some embodiments, training component 220 from a different apparatus other than image segmentation apparatus 200 can be used to train machine learning model 225.

According to some embodiments, teacher network 230 generates a pseudo mask for the object based on the text describing the object. In some examples, teacher network 230 generates a set of candidate regions for the object. Teacher network 230 generates features corresponding to each of the set of candidate regions. Teacher network 230 compares the features corresponding to each of the set of candidate regions to the text features. Teacher network 230 selects a candidate region of the set of candidate regions based on the comparison, where the pseudo mask is generated based on the selected candidate region. In some examples, teacher network 230 generates a set of pseudo masks corresponding to the set of text feature vectors. In some examples, teacher network 230 generates predicted annotations for each image in the annotated training set.

According to some embodiments, teacher network 230 is configured to generate a pseudo mask for an object in an image based on text describing the object in the image. In some examples, the teacher network 230 includes an embedding head configured to generate a semantic embedding of the image and a mask head configured to generate the pseudo mask. Teacher network 230 is an example of, or includes aspects of, the corresponding element described with reference to FIG. 10. In some examples, teacher network 230 may not be a part of image segmentation apparatus 200 at inference time.

According to some embodiments, student network 235 generates a mask for the object. In some examples, student network 235 generates a set of masks corresponding to the set of objects. In some examples, student network 235 generates predicted annotations for each image in the annotated training set. In some examples, student network 235 includes an image encoder configured to generate image features for the image and a mask generation head configured to generate the mask for the object. Student network 235 is an example of, or includes aspects of, the corresponding element described with reference to FIG. 8.

According to some embodiments, noise estimation network 240 computes noise information for the training image. In some examples, noise estimation network 240 identifies a bounding box containing at least a portion of the object. Noise estimation network 240 generates a noise value for each pixel within the bounding box, where the noise information includes the noise value for each of the pixels. In some examples, noise estimation network 240 combines the mask with the noise information to obtain a noise-adjusted mask. Noise estimation network 240 is an example of, or includes aspects of, the corresponding element described with reference to FIG. 5.

According to some embodiments, text encoder 245 encodes the text describing the object to obtain text features. In some examples, text encoder 245 generates a set of text feature vectors corresponding to a set of objects in the training image, respectively. In some examples, text encoder 245 generates text features for the caption.

According to some embodiments, text encoder 245 is configured to encode the text describing the object to obtain text features, wherein training component 220 is configured to compute a cross-modal loss based on the text features. Text encoder 245 is an example of, or includes aspects of, the corresponding element described with reference to FIG. 10.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Image Segmentation

FIG. 3 shows an example of image editing according to aspects of the present disclosure. For example, the method may be performed by user 100 interacting with image segmentation apparatus 110 via user device 105 as described with reference to FIG. 1. In some examples, these operations are performed by a system including a processor executing a set of codes to control functional elements of an apparatus. Image segmentation apparatus 110 can be implemented on a mobile device to perform image editing. A user uploads an original image depicting an object. Image segmentation apparatus 110 returns a mask and class prediction corresponding to the object in the image. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 305, the user provides an image. In some cases, the operations of this step refer to, or may be performed by, a user as described with reference to FIG. 1. The user can take a photograph or select an image using a mobile device.

At operation 310, the system generates a mask for an object in the image. In some cases, the operations of this step refer to, or may be performed by, an image segmentation apparatus as described with reference to FIGS. 1 and 2. One or more objects in the image can be detected using a student network of the image segmentation apparatus. As an example, the student network identifies a first object as microwave and generates a mask indicating the location of the microwave. The student network identifies a second object as coffee machine and generates a mask indicating the location of the coffee machine.

At operation 315, the system provides the mask to the user. In some cases, the operations of this step refer to, or may be performed by, an image segmentation apparatus as described with reference to FIGS. 1 and 2. In some examples, the image segmentation apparatus provides a bounding box with a label indicating the class of the object in the image (e.g., microwave, coffee machine). If there are multiple objects of the same class in the image, the image segmentation apparatus may also identify and segment each instance of the objects and associate each instance with a class label.

At operation 320, the user edits the image based on the mask. In some cases, the operations of this step refer to, or may be performed by, a user as described with reference to FIG. 1. The user edits the image based on the object detection information (e.g., mask, bounding box, class label prediction). For example, the user can edit the image using an image editing application on a mobile device.

FIG. 4 shows an example of image segmentation according to aspects of the present disclosure. The example shown includes image 400, caption 405, segmented image 410, and label data 415. Conventional pseudo-labeling is limited to segmenting objects based on visual modality, which produces incorrect labels and misses unseen object classes. Image segmentation apparatus 200 leverages visual modality and textual modality by aligning semantics of text (e.g., caption words) with visual features of object masks to correctly label objects and generalize to unseen classes without costly mask annotations.

Image segmentation apparatus 200 as shown in FIG. 2 is a cross-modal pseudo-labeling framework, where teacher network 230 generates caption-driven pseudo masks and fully utilizes captioned images for segmentation training without requiring instance mask annotations. Image segmentation apparatus 200 can work with unseen classes by selecting regions whose visual features are most compatible with the semantics of unseen classes and segmenting these regions into pseudo masks to self-train student network 235. In some cases, unseen classes may also be referred to as novel classes.

As an example shown in FIG. 4, caption 405 (i.e., textual modality) mentions one or more objects of an image. Caption 405 states "a microwave under a coffee machine", which mentions microwave object and coffee machine object in the image. By cross-modal pseudo-labeling operation, image segmentation apparatus 200 can generate a mask for microwave object (base class) and a second mask for coffee machine (unseen class).

Caption 405 is an example of, or includes aspects of, the corresponding element described with reference to FIG. 7. Segmented image 410 is an example of, or includes aspects of, the corresponding element described with reference to FIG. 7. In some examples, segmented image 410 includes label data 415 (e.g., bounding box, mask annotation, label, etc.).

Training and Evaluation

In FIGS. 5-9, a method, apparatus, and non-transitory computer readable medium for training a machine learning model are described. One or more embodiments of the method, apparatus, and non-transitory computer readable medium include receiving a training image and a caption for the training image, wherein the caption includes text describing an object in the training image; generating a pseudo mask for the object using a teacher network based on the text describing the object; generating a mask for the object using a student network; computing noise information for the training image using a noise estimation network; and updating parameters of the student network based on the mask, the pseudo mask, and the noise information.

Some examples of the method, apparatus, and non-transitory computer readable medium further include identifying a bounding box containing at least a portion of the object. Some examples further include generating a noise value for each pixel within the bounding box, wherein the noise information includes the noise value for each of the pixels.

Some examples of the method, apparatus, and non-transitory computer readable medium further include encoding the text describing the object to obtain text features. Some examples further include generating a plurality of candidate regions for the object using the teacher network. Some examples further include generating features corresponding to each of the plurality of candidate regions. Some examples further include comparing the features corresponding to each of the plurality of candidate regions to the text features. Some examples further include selecting a candidate region of the plurality of candidate regions based on the comparison, wherein the pseudo mask is generated based on the selected candidate region.

Some examples of the method, apparatus, and non-transitory computer readable medium further include mapping the features corresponding to each of the plurality of candidate regions into an embedding space of the text features, wherein the comparison is based on the mapping.

Some examples of the method, apparatus, and non-transitory computer readable medium further include combining the mask with the noise information to obtain a noise-adjusted mask. Some examples further include computing a cross-entropy loss based on the pseudo mask and the noise-adjusted mask, wherein the parameters of the student network are updated based on the cross-entropy loss.

Some examples of the method, apparatus, and non-transitory computer readable medium further include generating a plurality of text feature vectors corresponding to a plurality of objects in the training image, respectively. Some examples further include generating a plurality of pseudo masks corresponding to the plurality of text feature vectors using the teacher network. Some examples further include generating a plurality of masks corresponding to the plurality of objects using the student network. Some examples further include comparing each of the plurality of masks to a corresponding pseudo mask of the plurality of pseudo masks to obtain the cross-entropy loss.

Some examples of the method, apparatus, and non-transitory computer readable medium further include generating image features for the training image using an image encoder of the student network. Some examples further include generating text features for the caption using a text encoder. Some examples further include computing a cross-modal loss based on the image features and the text features, wherein the parameters of the student network are updated based on the cross-modal loss.

Some examples of the method, apparatus, and non-transitory computer readable medium further include selecting a candidate region of the training image that includes the object, wherein the image features are generated based on the candidate region.

Some examples of the method, apparatus, and non-transitory computer readable medium further include receiving an annotated training set, wherein each image in the annotated training set is associated with ground truth annotations. Some examples further include generating predicted annotations for each image in the annotated training set using the student network. Some examples further include computing a ground truth loss by comparing the predicted annotations to the ground truth annotations, wherein the parameters of the student network are updated based on the ground truth loss. In some examples, the annotated training set does not include annotation data for the object in the training image.

Some examples of the method, apparatus, and non-transitory computer readable medium further include receiving an annotated training set, wherein each image in the annotated training set is associated with ground truth annotations. Some examples further include generating predicted annotations for each image in the annotated training set using the teacher network. Some examples further include computing a ground truth loss by comparing the predicted annotations to the ground truth annotations. Some examples further include updating parameters of the teacher network based on the ground truth loss.

A method, apparatus, and non-transitory computer readable medium for training a machine learning model are described. One or more embodiments of the method, apparatus, and non-transitory computer readable medium include receiving a training image and a caption for the training image, wherein the caption includes text describing an object in the training image; generating a pseudo mask for the object using a teacher network based on the text describing the object; generating a mask for the object using a student network; generating text features for the caption using a text encoder; and updating parameters of the student network based on the mask, the pseudo mask, and the text features.

Some examples of the method, apparatus, and non-transitory computer readable medium further include generating image features for the training image using an image encoder of the student network. Some examples further include computing a cross-modal loss based on the image features and the text features, wherein the parameters of the student network are updated based on the cross-modal loss.

Some examples of the method, apparatus, and non-transitory computer readable medium further include selecting a candidate region of the training image that includes the object, wherein the image features are generated based on the candidate region.

Some examples of the method, apparatus, and non-transitory computer readable medium further include computing noise information for the training image using a noise estimation network. Some examples further include combining the mask with the noise information to obtain a noise-adjusted mask. Some examples further include computing a cross-entropy loss based on the pseudo mask and the noise-adjusted mask, wherein the parameters of the student network are updated based on the cross-entropy loss.

Figure 5:
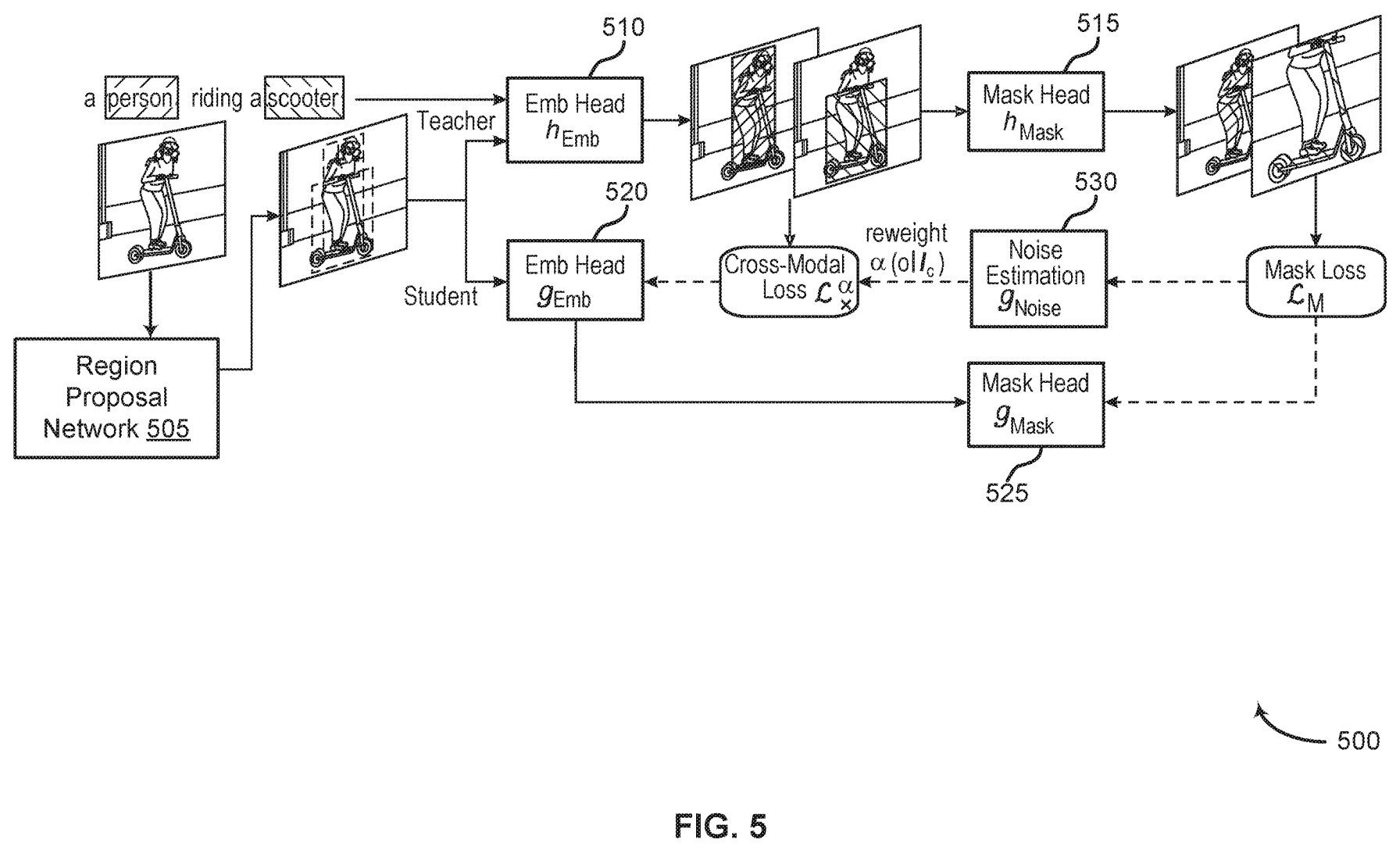

FIG. 5 shows an example of a method for training a machine learning model 500 according to aspects of the present disclosure. Training component 220 as shown in FIG. 2 is used to train machine learning model 500. The example shown includes machine learning model 500, region proposal network 505, embedding head of teacher 510, mask head of teacher 515, embedding head of student 520, mask head of student 525, and noise estimation network 530. According to an embodiment of the present disclosure, a cross-modal pseudo-labeling framework is configured to accurately execute open vocabulary instance segmentation. The cross-modal pseudo-labeling framework provides mask supervision for unseen classes in captioned images. That is, machine learning mode 500 aligns semantics of unseen classes in a caption with visual features of object regions of an image for classification and applies class-agnostic segmentation for mask predictions.

In some cases, embedding head of teacher 510 and/or embedding head of student 520 includes an image encoder, which is configured to generate image features for an image. Embedding head of teacher 510 is configured to generate a semantic embedding of the image. Mask head of teacher 515 is a mask classification head configured to classify an object of the image into a class. Additionally or alternatively, mask head of teacher 515 is a mask head configured to generate the pseudo mask for a corresponding object in the image. Mask head of student 525 is a mask generation head configured to generate a mask for an object in an image.

As an example shown in FIG. 5, machine learning model 500 includes cross-modal pseudo-labeling framework configured to use caption-image pairs to produce pseudo masks and self-train a student network. Let $$\mathcal{D}_B = \{(I_m, y_m)\}_{m=1}^{N_B}$$

be the set of training images and instance annotations for a limited set of base classes $\mathcal{V}_B$. Each image $I_m$ is associated with a set of ground-truth (GT) annotations $\mathcal{Y}_m$, which comprises instance masks and the corresponding object classes. Additional images $$\mathcal{D}_C = \{(I_c, y_c)\}_{c=1}^{N_C}$$

are leveraged with image-level captions to segment unseen classes. Each image $I_c$ is annotated with a caption from which a set of object nouns $\mathcal{O}_c \subset \mathcal{Y}_c$ in each caption can be extracted. Since caption annotations are relatively inexpensive to source, the set of caption classes, $|\mathcal{V}_c|$, is significantly larger than base classes, i.e., $|\mathcal{V}_c| >> |\mathcal{V}_B|$, which improves the segmentation of unseen classes.

A set of target classes, $\mathcal{V}_T$, are constructed without any mask annotations and unknown to the model during training. The classes are used as a proxy to evaluate the segmentation performance of unseen classes during test time (i.e., at inference). Machine learning model 500 can recognize a large number of unseen classes using the high-level semantic embeddings $\{v_0\}$, for all object classes $o \in \mathcal{V}_B \cup \mathcal{V}_C \cup \mathcal{V}_T$, from a pre-trained BERT model. Given the BERT embeddings, knowledge from base/caption is transferred to target classes via class semantic similarity.

According to an embodiment, given an image $I_c$ and the set of objects in captions OC, machine learning model 500 first generates region proposals via region proposal network 505. Region proposal network 505 finds the regions that maximize the scores of embedding head of teacher 510 ($h_{Emb}$) for each object in the caption. Machine learning model 500 further segment objects within these regions into pseudo masks using mask head of teacher 515 ($h_{Mask}$). Finally, embedding head of student 520 ($g_{Emb}$) and mask head of student 525 ($g_{Mask}$) are trained via a cross-modal loss and a mask loss, respectively. The cross-modal loss is also re-weighted based on the pseudo-mask noise levels learned from the pseudo-mask loss. For example, training component 220 down-weights influence from pseudo masks that have high noise levels. Detail regarding training machine learning model 500 is described in FIGS. 6, 8, and 9. In some cases, the teacher network is denoted as h while the student network is denoted as g.

In some cases, the teacher network segments unseen classes, but it may mis-classify unseen classes due to their lack of training annotations. To provide additional supervision for unseen classes without incurring high annotation costs, machine learning model 500 applies a cross-modal pseudo-learning method herein that depends on semantic information of caption words to guide teacher network's predictions. The teacher network generates pseudo masks for self-training a student network. That is, cross-modal pseudo-learning method generates additional supervision for unseen classes without incurring high annotation costs.

According to one or more embodiments, region proposal network 505 selects a set of region proposals in an image. Embedding head of teacher 510 maps region features into the semantic space of word embeddings. In some examples, embedding head of teacher 510 outputs visual embedding of a region proposal in the image, which is then compared to text embedding of an object class mentioned in the caption (e.g., text identified in a captioned image). One or more bounding boxes (shown in FIG. 5) are selected based on the comparison (i.e., semantic match in a joint embedding space between visual features and word embeddings). Output from embedding head of teacher 510 is input to mask head of teacher 515 for pseudo mask generation. The output from embedding head of teacher 510 may not be a bounding box.

In some cases, a region proposal may also be referred to as a candidate bounding box (e.g., an image crop of the image). A candidate bounding box is passed to embedding head of teacher 510 to obtain a visual embedding. If the visual embedding of the candidate bounding box is close to word embedding of a (object class) phrase in the caption, the candidate bounding box is selected and labeled with the (object class) phrase. Similarly, output from embedding head of student 520 is input to mask head of student 525.

According to an embodiment, a cross-modal loss acts on embedding head of student 520. In some cases, the cross-modal loss disregards mask head of student 525 for instance segmentation. The teacher network generates pseudo masks corresponding to objects of an image and noise estimation network 530 estimates the noise levels of the pseudo masks. The cross-modal pseudo-labeling provides supervision for mask head of student 525 and regulates the cross-modal loss. This way, the cross-modal loss is refined based on the estimated pseudo mask noises.

Machine learning model 500 is an example of, or includes aspects of, the corresponding element described with reference to FIG. 2. Noise estimation network 530 is an example of, or includes aspects of, the corresponding element described with reference to FIG. 2.

FIG. 6 shows an example of a method for training a machine learning model using noise estimation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during a training process, the parameters and weights of the machine learning model are adjusted to increase the accuracy of the result (e.g., attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

At operation 605, the system receives a training image and a caption for the training image, where the caption includes text describing an object in the training image. In some cases, the operations of this step refer to, or may be performed by, a training component as described with reference to FIGS. 2 and 10. In some examples, a caption includes one or more noun phrases.

At operation 610, the system generates a pseudo mask for the object using a teacher network based on the text describing the object. In some cases, the operations of this step refer to, or may be performed by, a teacher network as described with reference to FIGS. 2 and 10. Referring to FIG. 5, a teacher network, denoted as h, can segment unseen classes based on the word embeddings of the classes. The teacher network may be used to extract mask supervision from captioned images. A two-stage detection framework, Mask R-CNN is built, i.e., a class-agnostic region proposal network, denoted as p, is trained to select a set of region proposals in each image:

$$\{r_i\}_{i=1}^{N_R} = p(I).$$

Given the region proposals, the machine learning model classifies them to any classes mentioned in the captions extending beyond base classes. Therefore, the conventional fully connected layer in the classification head of Mask R-CNN is replaced with an embedding head $h_{Emb}$. Here, $h_{Emb}$ maps the region features into the semantic space of word embeddings. With the embedding head, the score of class o for each region is computed as inner-product between the word embedding of the class and the region's visual feature:

$$v_o^{\mathrm{T}} h_{Emb}(f_r^I) \forall r \in p(I) \tag{1}$$

where $v_0$ is the word embedding for class o, $f_r^I$ is the visual feature of region r extracted from the visual backbone using a quantization-free layer (i.e., RoIAlign) and $h_{Emb}(f_r^I)$ is the visual embedding of the region. To simplify notation, the super-script I is dropped in $f_r^I$ which can be inferred from the context.

The teacher network learns a joint embedding space between visual features and the word embeddings and further the teacher network generalizes to unseen classes without training samples by measuring the compatibility between visual and textual features. In some cases, the background embedding may be defined to be a fixed zero vector. Thus, a region proposal is considered background if its class scores are lower than the background score. Additionally, the machine learning model learns a class-agnostic Mask R-CNN-based head to segment object in each region as, $hM_{ask}(f_r)$, where $h_{Mask}(\bullet)$ is a mask head of teacher predicting mask logit scores (see mask head of teacher 515 of FIG. 5). The ground-truth loss, $\mathcal{L}_{GT}$, includes a detection loss and a segmentation loss. $\mathcal{L}_{GT}$ is a loss used to train embedding head and mask head of the teacher network.

At operation 615, the system generates a mask for the object using a student network. In some cases, the operations of this step refer to, or may be performed by, a student network as described with reference to FIG. 10. In some cases, the student network is denoted as g. Embedding head of student ($g_{Emb}$) and mask head of student 525 ($g_{Mask}$) are trained via a cross-modal loss and a mask loss, respectively.

At operation 620, the system computes noise information for the training image using a noise estimation network. In some cases, the operations of this step refer to, or may be performed by, a noise estimation network as described with reference to FIGS. 2 and 5. In some embodiments, a noise estimation network estimates pseudo-mask noise.

Referring to FIGS. 5 and 9, given aligned object regions, the machine learning model turns them into pseudo masks by applying the mask head of teacher on these regions:

$$M_o = \mathbb{1}_{\geq 0}[h_{Mask}(f_{b_o})] \forall o \in \mathcal{O}_c, \tag{2}$$

where $\mathbb{1}_{\geq 0}[\bullet]$ is an indicator function which outputs 1 if a pixel prediction is positive and 0 otherwise to binarize mask predictions.

Pseudo masks with segmentation errors (difficult for a student network to learn) may drive $g_{Noise}$ to estimate high noise levels to fit the segmentation errors. The cross-modal pseudo-labeling framework (e.g., machine learning model 500), via training component 220, trains the mask head of student on pseudo masks and estimates pseudo-mask noise to regulate the training loss and account for possible segmentation errors of the teacher network.

At operation 625, the system updates parameters of the student network based on the mask, the pseudo mask, and the noise information. In some cases, the operations of this step refer to, or may be performed by, a training component as described with reference to FIGS. 2 and 10.

In some cases, one or more objects in captions may not be correctly detected or segmented due to errors in predictions from the teacher network. Thus, minimizing the pixel-wise loss propagates the errors from pseudo masks to the mask head of student and performance of the student mask head is decreased accordingly. The noise level in pseudo masks is estimated to account for errors in pseudo labels generated from the teacher network. That is, the student network is trained to generate or predict an additional noise value for each pixel in pseudo masks. Each pixel in a pseudo mask may be corrupted by a Gaussian noise whose variances can be estimated via the visual features of the aligned object region.

Figure 7:
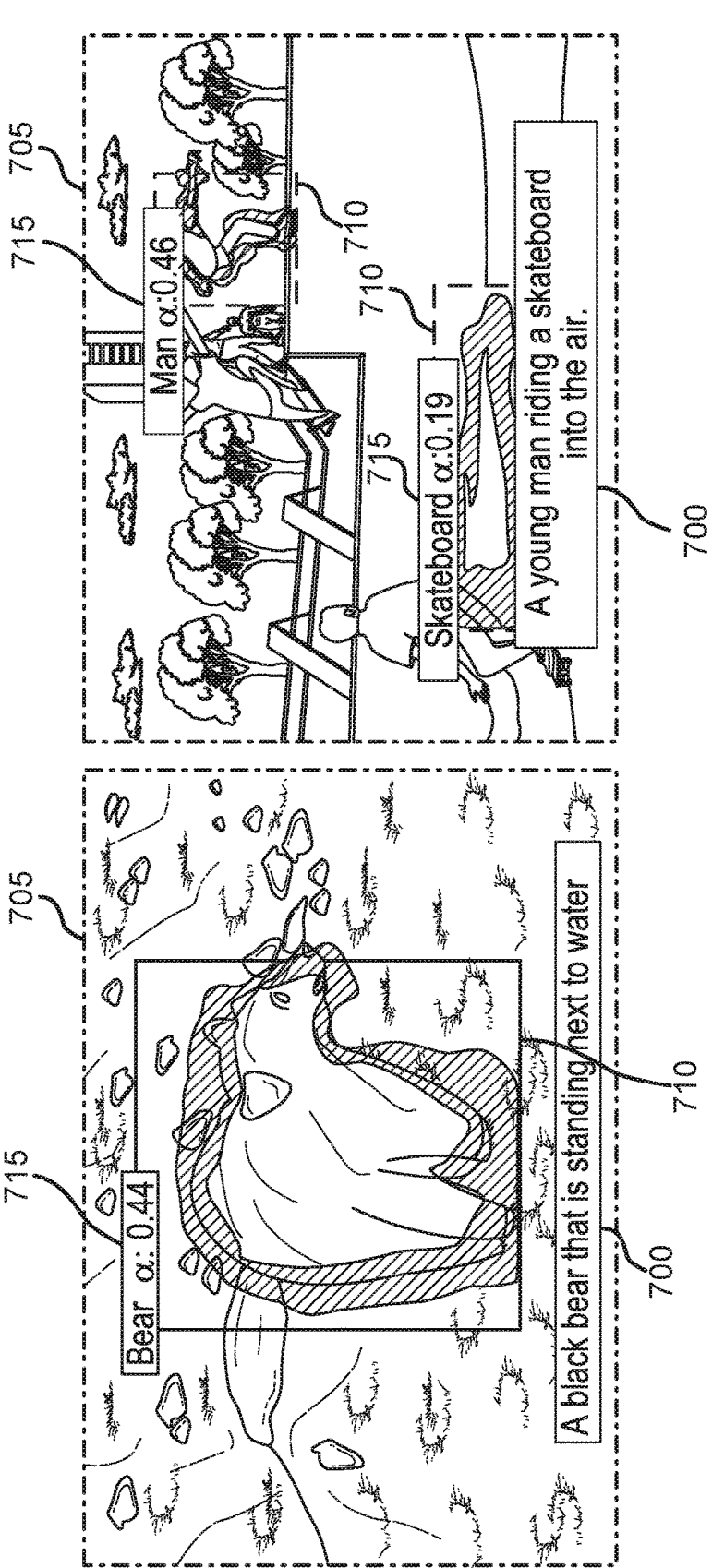
FIG. 7 shows an example of pseudo mask noise levels and reliability scores according to aspects of the present disclosure.

FIG. 7 shows an example of pseudo mask noise levels and reliability scores 715 according to aspects of the present disclosure. Noise estimation network shown in FIGS. 2 and 5 may be used to compute pseudo mask noise levels. The example shown includes caption 700, segmented image 705, labeled data 710, and reliability score 715. FIG. 7 shows pseudo mask noise levels and their reliability scores for objects mentioned in captions. In some examples, a reliability score, $\alpha(o|I_c)$, is assigned for each object in captions as the inverse of the average noise level to indicate the mask reliability. As a first example shown on the left of FIG. 7, segmented image 705 is associated with caption 700, which states "a black bear that is standing next to water." An object mentioned in caption 700 is "bear". Machine learning model 225 calculates reliability score 715, $\alpha=0.44$. Segmented image 705 includes label data (e.g., mask) corresponding to the object "bear". Reliability score 715 indicates the mask reliability is fair.

As a second example shown on the right of FIG. 7, segmented image 705 is associated with caption 700, which states "a young man riding a skateboard into the air." A first object mentioned in caption 700 is "bear". A second object mentioned in caption 700 is "skateboard". Machine learning model 225 calculates reliability score 715 corresponding to mask of "skateboard", $\alpha=0.19$. In addition, machine learning model 225 calculates reliability score 715 corresponding to mask of object "man", $\alpha=0.46$. Reliability score 715 indicates the mask reliability of "man" is relatively higher than mask reliability of "skateboard". That is, machine learning model 225 calculates a reliability score for the two objects and indicates that mask for "man" is more reliable than the mask for "skateboard".

In some examples, when a student network has a hard time learning to classify between background and foreground pixels of the pseudo masks, a training process of the present disclosure drives the noise levels high and reduces the reliability scores of the pseudo masks. In some examples, mis-localized pseudo masks may result in low reliability scores due to indistinguishable object boundaries.

Caption 700 is an example of, or includes aspects of, the corresponding element described with reference to FIG. 4. Segmented image 705 is an example of, or includes aspects of, the corresponding element described with reference to FIG. 4.

Figure 8:
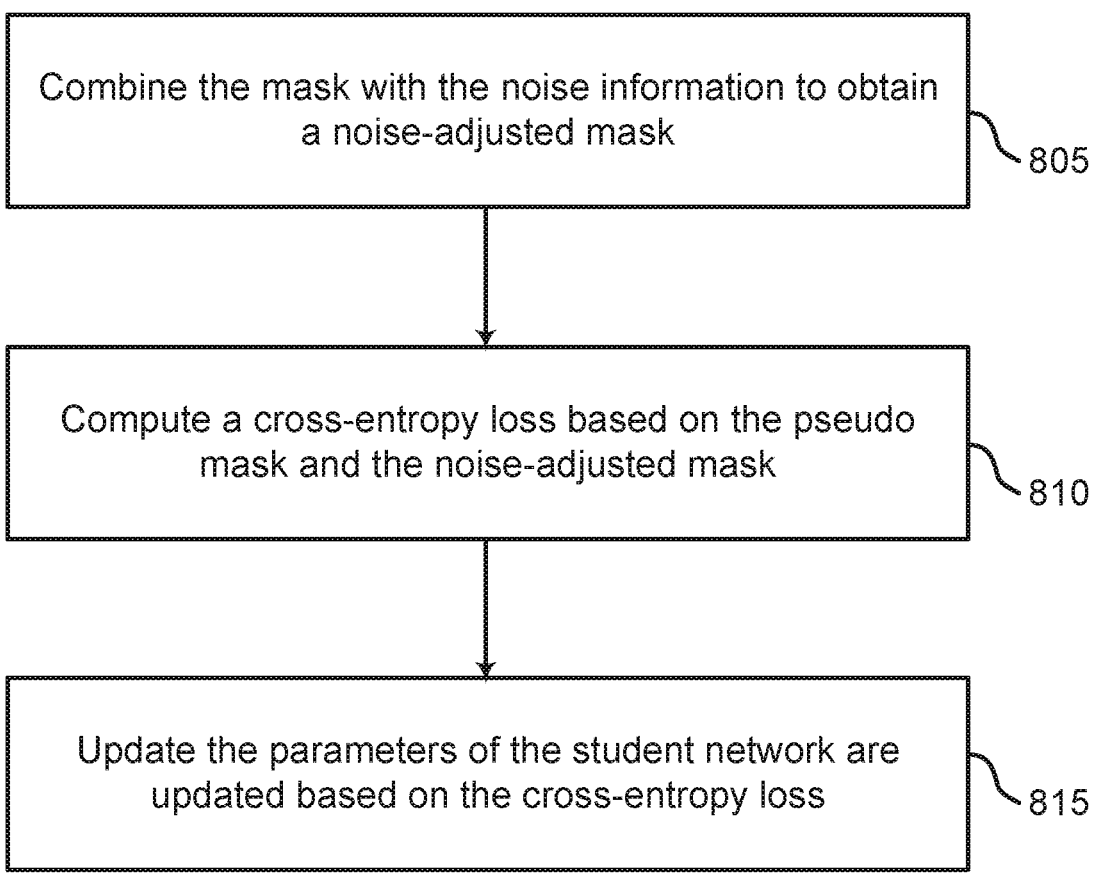
FIG. 8 shows an example of a method for training a student network according to aspects of the present disclosure.

FIG. 8 shows an example of a method for training a student network according to aspects of the present disclosure. Training component 220 as shown in FIG. 2 trains a student network, guided by a teacher network and caption information. According to an embodiment, the student network is trained based on a cross-entropy loss. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system combines the mask with the noise information to obtain a noise-adjusted mask. In some cases, the operations of this step refer to, or may be performed by, a training component as described with reference to FIGS. 2 and 10.

At operation 810, the system computes a cross-entropy loss based on the pseudo mask and the noise-adjusted mask. In some cases, the operations of this step refer to, or may be performed by, a training component as described with reference to FIGS. 2 and 10. The student network is trained to mimic the exact pseudo masks at each pixel as follows:

$$\sum_{o\in O_c}\sum_{x,y}\mathcal{L}_{BCE}\left(M_o^{xy}\,|\,g_{Mask}^{xy}(f_{b_o})\right), \tag{3}$$

where BCE is the binary cross-entropy loss for pixel logit predictions, $M_o^{xy}$ is the pseudo masks at pixel (x,y) and $g_{Mask}^{xy}$ is the student mask predictions at the pixel.

In some cases, one or more objects in captions may not be correctly detected or segmented due to errors in predictions from the teacher network. Thus, minimizing the pixel-wise loss propagates the errors from pseudo masks to the mask head of student and performance of the student mask head is decreased accordingly. The noise level in pseudo masks is estimated to account for errors in pseudo labels generated from the teacher network. That is, the student network predicts an additional noise value for each pixel in pseudo masks. Each pixel in a pseudo mask may be corrupted by a Gaussian noise whose variances can be estimated via the visual features of the aligned object region. Thus, the machine learning model learns to estimate the pixel-wise noise as follows:

$$\mathcal{L}_M(y_c\,|\,I_c, g) = \sum_{o\in O_c}\sum_{x,y}\mathcal{L}_{BCE}\left(M_o^{xy}\,|\,g_{Mask}^{xy}(f_{b_o}) + \epsilon_o^{xy}\right) \tag{4}$$

$$\epsilon_o^{xy} \sim \mathcal{N}\left(0, g_{Noise}^{xy}(f_{b_o})\right),$$

where $g_{Noise}$ is a neural network predicting the noise levels from the visual features of aligned object regions $f_{b_o}$. In addition, $\epsilon_o^{xy}$ is the noise value for the pixel (x,y) of object o sampled from the Gaussian distribution, $\mathcal{N}$, parameterized by $g_{Noise}$.

In some cases, mask noises may be considered as a proxy on how reliable the pseudo masks are because the student network and the teacher network are unaware of the correct unseen object masks due to lack of annotations (i.e., no ground-truth). The noise level of each pseudo mask is computed as the average of pixel noise: $\Sigma_{x,y}g_{Noise}^{xy}(f_{b_o})/|b_o|$ where $|b_o|$ is the number of pixels in region $b_o$. Next, a reliability score, $\alpha(o|I_c)$, is assigned for each object in captions as the inverse of the average noise level to indicate the mask reliability as follows:

$$\alpha(o\,|\,I_c) = \frac{\eta}{\Sigma_{x,y}g_{Noise}^{xy}(f_{b_o})/|b_o|}\forall\,o\in O_c \tag{5}$$

where $\eta$ is a constant value set to the smallest average noise level across captioned images.

In some examples, $\eta$ is determined by training on a subset of images and setting the smallest average noise level during training to be $\eta$. Furthermore, low weights are assigned to high-noise predictions with $\eta$ as the reference while up-weighting the clean pseudo masks with low noise levels.

At operation 815, the system updates the parameters of the student network based on the cross-entropy loss. In some cases, the operations of this step refer to, or may be performed by, a training component as described with reference to FIGS. 2 and 10.

FIG. 9 shows an example of a method for training a machine learning model based on text features according to aspects of the present disclosure. Training component 220 as shown in FIG. 2 trains a machine learning model. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system receives a training image and a caption for the training image, where the caption includes text describing an object in the training image. In some cases, the operations of this step refer to, or may be performed by, a training component as described with reference to FIGS. 2 and 10.

At operation 910, the system generates a pseudo mask for the object using a teacher network based on the text describing the object. In some cases, the operations of this step refer to, or may be performed by, a teacher network as described with reference to FIGS. 2 and 10.

At operation 915, the system generates a mask for the object using a student network. In some cases, the operations of this step refer to, or may be performed by, a student network as described with reference to FIG. 10.

At operation 920, the system generates text features for the caption using a text encoder. In some cases, the operations of this step refer to, or may be performed by, a text encoder as described with reference to FIGS. 2 and 10.

According to some embodiments, the teacher network's performance in unseen classes is increased by combining the teacher network with caption guidance and regulating teacher predictions on what objects and where to construct the pseudo masks for training a student network, g. In some examples, captions may be used to identify objects in images. The object nouns in each caption are extracted, $\mathcal{O}_c \subset \mathcal{Y}_c$, as words that are descendants of object node in a lexical database (e.g., WordNet) hierarchy. The machine learning model applies a cross-modal alignment step to localize object words in images. In some cases, the machine learning model, via cross-modal alignment, selects the regions whose features are most compatible with the word embeddings of object nouns in captions as follows:

$$b_o = \underset{r \in p(I_c)}{\mathrm{argmax}}\left(v_o^T h_{Emb}(f_r)\right) \ \forall \ o \in \mathcal{O}_c \tag{i}$$

where $b_o$ is the aligned object region for object o with respect to the word embedding $v_o$ and visual embedding from the teacher network, $h_{Emb}(f_r)$.

In some cases, the pseudo labeling procedure is guided by the word semantics in captions. Thus, the machine learning model searches for objects in captions and generalize to unseen classes based on the word embeddings. The highest confident bounding box for each object is selected to minimize false-positive predictions.

At operation 925, the system updates parameters of the student network based on the mask, the pseudo mask, and the text features. In some cases, the operations of this step refer to, or may be performed by, a training component as described with reference to FIGS. 2 and 10. Given the set of aligned object regions, a cross-modal loss, $\mathcal{L}_X$, is used to train the student network to identify these regions as the positively-matched caption words:

$$\mathcal{L}_X(y_c \mid I_c; g) = -\sum_{o \in \mathcal{O}_c} \log \frac{e^{v_o^T g_{Emb}(f_{b_o})}}{\sum_{w \in V_o} e^{v_w^T g_{Emb}(f_{b_o})}} \tag{7}$$

where $g_{Emb}$ is the embedding head of student.

For each aligned object region $b_o$, the student network maximizes the scores of object words in captions and minimizes the scores of other irrelevant words w via Softmax normalization. The information from word embeddings $\{v_o\}_{o \in \mathcal{O}_c}$ (textual modality) and aligned object regions $\{f_{b_o}\}_{o \in \mathcal{O}_c}$ (visual modality) is distilled into the student embedding head to expand the student network's knowledge about the unseen classes in captions.

According to some embodiments, the student network is trained on datasets of caption and base classes following the objective function:

$$\min_{g=\{g_{Emb}, g_{Mask}, g_{Noise}\}} \sum_{c \in \mathcal{D}_c} \mathcal{L}_M(y_c \mid I_c; g) + \tag{8}$$

$$\mathcal{L}_X^\alpha(y_c \mid I_c; g) + \sum_{m \in \mathcal{D}_B} \mathcal{L}_{GT}(y_m \mid I_m; g)$$

where $\mathcal{L}_X^\alpha$ is the cross-modal loss modified to re-weight its term as follows:

$$\alpha(o \mid I_c) \times \log \frac{e^{v_o^T g_{Emb}(f_{b_o})}}{\sum_{w \in V_o} e^{v_w^T g_{Emb}(f_{b_o})}}$$

for each object, $o \in \mathcal{O}$. Thus, the machine learning model down-weights the cross-modal loss on noisy predictions to avoid the error propagation from the teacher network to the student network.

Figure 10:
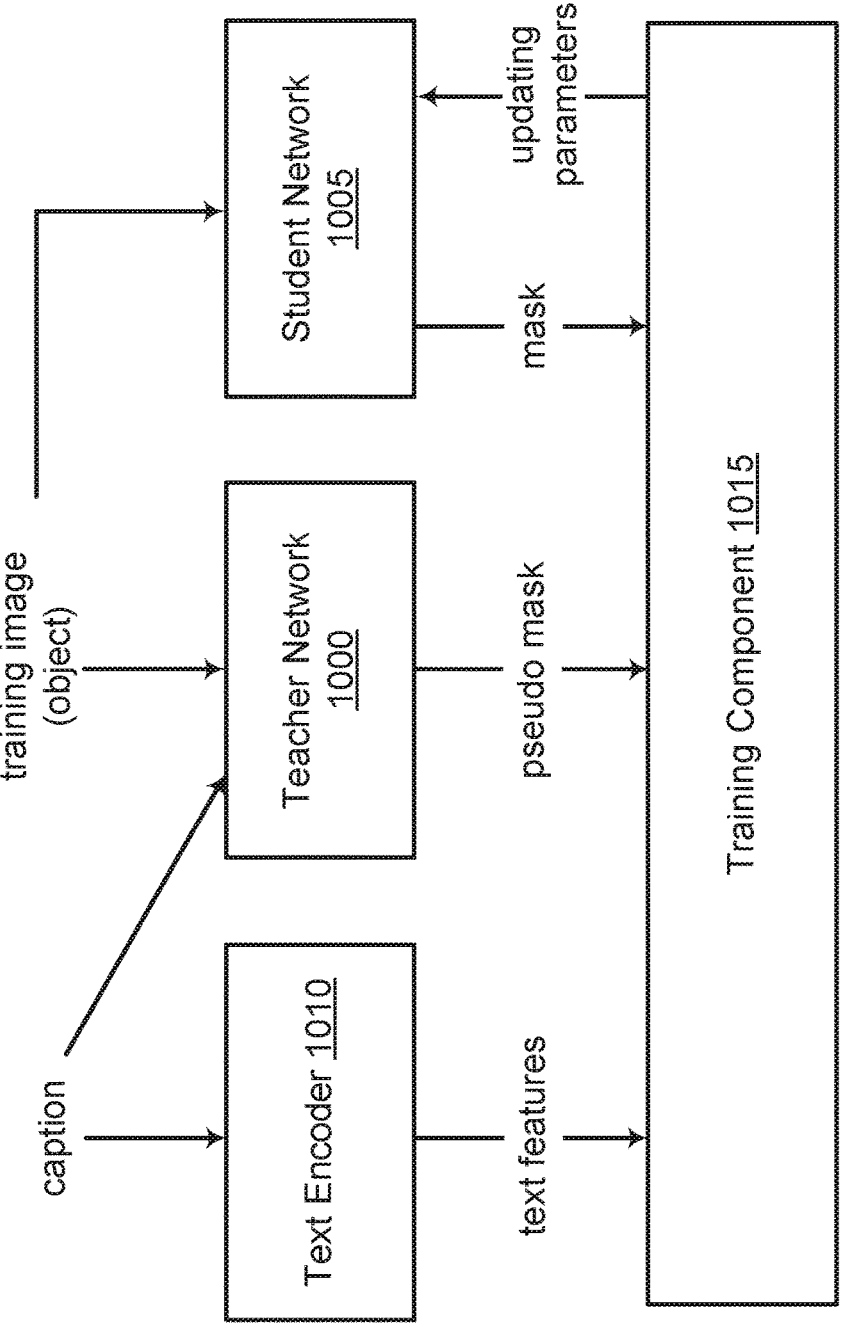
FIG. 10 shows an example of training a student network according to aspects of the present disclosure.

FIG. 10 shows an example of training a student network 1005 according to aspects of the present disclosure. A cross-modal pseudo-labeling framework as shown in FIG. 5 is configured for open-vocabulary instance segmentation. The example shown includes teacher network 1000, student network 1005, text encoder 1010, and training component 1015. Teacher network 1000 is an example of, or includes aspects of, the corresponding element described with reference to FIG. 2. Student network 1005 is an example of, or includes aspects of, the corresponding element described with reference to FIG. 2. Text encoder 1010 is an example of, or includes aspects of, the corresponding element described with reference to FIG. 2. Training component 1015 is an example of, or includes aspects of, the corresponding element described with reference to FIG. 2.

The machine learning model generates pseudo masks by selecting the mask predictions for each caption-image pair whose visual features are most compatible with semantic embeddings of object words in captions. In an embodiment, teacher network 1000 includes an embedding head for classification (i.e., embedding head of teacher) and a class-agnostic mask head for segmentation (i.e., mask head of teacher). Training component 1015 distills mask knowledge from predictions of teacher network 1000 and captions into student network 1005. Student network 1005 jointly learns from pseudo masks and estimates mask noise levels to down-weight unreliable pseudo masks.

Teacher network 1000 segments unseen classes based on the word embeddings of the classes. Teacher network 1000 extracts mask supervision from captioned images (i.e., an image with a caption, where the caption mentions an object in the image). Teacher network 1000 learns a joint embedding space between visual features and the word embeddings. Teacher network 1000 can generalize to unseen classes without training samples by measuring the compatibility between visual and textual features. In some cases, Teacher network 1000 may mis-classify unseen classes due to their lack of training annotations. To provide additional supervision for unseen classes without incurring high annotation costs, machine learning model 225 applies a cross-modal pseudo-learning method herein that uses semantic information of caption words to guide predictions of teacher network 1000.

According to some embodiments, teacher network 1000 generates pseudo masks for self-training student network 1005. That is, cross-modal pseudo-learning method provides additional supervision for unseen classes without incurring high annotation costs.

The noise level in pseudo masks is estimated to account for errors in pseudo labels generated from teacher network 1000. That is, student network 1005 predicts an additional noise value for each pixel in pseudo masks. Training component 1015 trains the mask head of student on pseudo masks and estimates pseudo-mask noise, via a noise estimation network, to regulate the training loss and account for possible segmentation errors of teacher network 1000. In an embodiment, training component 1015 downweights the cross-modal loss on noisy pseudo mask predictions to eliminate error propagation from teacher network 1000 to student network 1005.

According to some embodiments, text encoder 1010 is configured to encode the text (e.g., caption) describing an object of a training image to obtain text features, where training component 1015 is configured to compute a cross-modal loss based on the text features. In some examples, captions help teacher network 1000 identify objects in images. The object nouns in a caption are extracted as words that are descendants of object node in a lexical database (e.g., WordNet) hierarchy. Machine learning model 225 applies cross-modal alignment to localize object words in images. Machine learning model 225, via cross-modal alignment, selects the regions whose features are most compatible with the word embeddings of object nouns in captions. In some examples, text encoder 1010 generates the word embeddings of object nouns in captions. In some cases, the pseudo labeling procedure is guided by the word semantics in captions. Machine learning model 225 then searches for objects in captions and generalizes to unseen classes based on the word embeddings.

A word embedding is a learned representation for text where words that have the same meaning have a similar representation. Glove and Word2vec are examples of systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

Training component 1015 is configured to distill the mask knowledge and to estimate mask noises to decrease the adverse impact of incorrect pseudo masks. Training component 1015 updates parameters of student network 1005. Student network 1005 outperforms teacher network 1000 because student network 1005 is trained with cross-modal pseudo-labeling that leverages unseen-class information from captioned images. At training, a student network is trained to segment objects in captioned images without mask annotations, where such instance segmentation involves unseen/unknown classes during training.

Performance of apparatus, systems and methods of the present disclosure have been evaluated, and results indicate embodiments of the present disclosure have obtained increased performance over existing technology. Example experiments demonstrate that image segmentation apparatus 200 outperforms conventional systems. Some example experiments are conducted on MS-COCO and large-scale Open Images & Conceptual Captions datasets. Example experiments demonstrate that the student network has increased segmentation performance compared to the teacher network with respect to different amounts of pseudo masks on target classes in Conceptual Captions. Some example experiments partition target classes into groups of different ranges of pseudo masks and report average improvement per group. Relatively large increase in performance is correlated with classes having many pseudo masks. This shows the effectiveness of pseudo masks generated by the cross-modal pseudo-labeling framework.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for training a machine learning model, comprising:
   receiving an annotated training set, a training image and a caption for the training image, wherein each image in the annotated training set is associated with ground truth annotations, and wherein the caption includes text describing an object in the training image;
   generating predicted annotations for each image in the annotated training set using a student network;
   computing a ground truth loss by comparing the predicted annotations to the ground truth annotations;
   generating a pseudo mask for the object using a teacher network based on the text describing the object;
   generating a mask for the object using the student network separate from the teacher network;

estimating, using a noise estimation network, a noise level for the pseudo mask generated by the teacher network;

modifying the mask generated by the student network based on the noise level to obtain a noise-adjusted mask; and updating parameters of the student network based on the ground truth loss and the noise-adjusted mask.

2. The method of claim 1, further comprising:

computing noise information for the training image using the noise estimation network;

identifying a bounding box containing at least a portion of the object; and generating a noise value for each pixel of a plurality of pixels within the bounding box, wherein the noise information includes the noise value for each of the plurality of pixels.

3. The method of claim 1, further comprising:

encoding the text describing the object to obtain text features;

generating a plurality of candidate regions for the object using the teacher network;

generating features corresponding to each of the plurality of candidate regions;

comparing the features corresponding to each of the plurality of candidate regions to the text features; and selecting a candidate region of the plurality of candidate regions based on the comparison, wherein the pseudo mask is generated based on the selected candidate region.

4. The method of claim 3, further comprising:

mapping the features corresponding to each of the plurality of candidate regions into an embedding space of the text features, wherein the comparison is based on the mapping.

5. The method of claim 1, further comprising:

computing noise information for the training image;

combining the mask with the noise information to obtain the noise-adjusted mask; and computing a cross-entropy loss based on the pseudo mask and the noise-adjusted mask, wherein the parameters of the student network are updated based on the cross-entropy loss.

6. The method of claim 5, further comprising:

generating a plurality of text feature vectors corresponding to a plurality of objects in the training image, respectively;

generating a plurality of pseudo masks corresponding to the plurality of text feature vectors using the teacher network;

generating a plurality of masks corresponding to the plurality of objects using the student network; and comparing each of the plurality of masks to a corresponding pseudo mask of the plurality of pseudo masks to obtain the cross-entropy loss.

7. The method of claim 1, further comprising:

generating image features for the training image using an image encoder of the student network;

generating text features for the caption using a text encoder; and computing a cross-modal loss based on the image features and the text features, wherein the parameters of the student network are updated based on the cross-modal loss.

8. The method of claim 7, further comprising:

selecting a candidate region of the training image that includes the object, wherein the image features are generated based on the candidate region.

9. The method of claim 1, wherein:

the annotated training set does not include annotation data for the object in the training image.

10. The method of claim 1, further comprising:

generating predicted annotations for each image in the annotated training set using the teacher network;

computing a ground truth loss by comparing the predicted annotations to the ground truth annotations; and updating parameters of the teacher network based on the ground truth loss.

11. A method for training a machine learning model, comprising:

receiving a training image and a caption for the training image, wherein the caption includes text describing an object in the training image;

generating a plurality of candidate regions for the object using a teacher network;

generating features corresponding to each of the plurality of candidate regions;

generating text features for the caption using a text encoder;

comparing the features corresponding to each of the plurality of candidate regions to the text features by mapping the features corresponding to each of the plurality of candidate regions into an embedding space of the text features;

generating, using the teacher network, a pseudo mask for the object based on the text describing the object and the comparison;

generating a mask for the object using a student network; and updating parameters of the student network based on the mask, the pseudo mask, and the text features.

12. The method of claim 11, further comprising:

generating image features for the training image using an image encoder of the student network; and computing a cross-modal loss based on the image features and the text features, wherein the parameters of the student network are updated based on the cross-modal loss.

13. The method of claim 12, further comprising:

selecting a candidate region of the training image that includes the object, wherein the image features are generated based on the candidate region.

14. The method of claim 11, further comprising:

computing noise information for the training image using a noise estimation network;

combining the mask with the noise information to obtain a noise-adjusted mask; and computing a cross-entropy loss based on the pseudo mask and the noise-adjusted mask, wherein the parameters of the student network are updated based on the cross-entropy loss.

15. An apparatus comprising:

at least one processor;

at least one memory including instructions executable by the at least one processor; and a machine learning model comprising parameters in the at least one memory and configured to generate a mask for an element in an image, wherein the machine learning model is trained using steps comprising:

receiving an annotated training set, a training image and a caption for the training image, wherein each image in the annotated training set is associated with ground truth annotations, and wherein the caption includes text describing an object in the training image;

generating predicted annotations for each image in the annotated training set using a student network;

computing a ground truth loss by comparing the predicted annotations to the ground truth annotations;

generating a pseudo mask for the object using a teacher network based on the text describing the object;

generating a mask for the object using the student network separate from the teacher network;

estimating, using a noise estimation network, a noise level for the pseudo mask generated by the teacher network;

modifying the mask generated by the student network based on the noise level to obtain a noise-adjusted mask; and updating parameters of the student network based on the ground truth loss and the noise-adjusted mask.

16. The apparatus of claim 15, further comprising:

a text encoder configured to encode the text describing the object to obtain text features, wherein the machine learning model is trained to compute a cross-modal loss based on the text features.

17. The apparatus of claim 16, further comprising:

a mapping component configured to map image features corresponding to the training image into an embedding space of the text features.

18. The apparatus of claim 15, wherein:

the student network comprises an image encoder configured to generate image features for the training image and a mask generation head configured to generate the mask for the object.

19. The apparatus of claim 15, wherein:

the teacher network comprises an embedding head configured to generate a semantic embedding of the training image and a mask head configured to generate the pseudo mask.

* * * * *